United States Patent
Klosterman

(10) Patent No.: US 11,778,289 B2
(45) Date of Patent: *Oct. 3, 2023

(54) MULTI-CAMERA IMAGING SYSTEMS

(71) Applicant: TAU TECHNOLOGIES, LLC, Albuquerque, NM (US)

(72) Inventor: John Klosterman, Corrales, NM (US)

(73) Assignee: Tau Technologies, LLC, Albuquerque, NM (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/407,048

(22) Filed: Aug. 19, 2021

(65) Prior Publication Data

US 2021/0385363 A1  Dec. 9, 2021

Related U.S. Application Data

(63) Continuation of application No. 16/333,989, filed as application No. PCT/US2017/052105 on Sep. 18, 2017, now Pat. No. 11,108,941.

(Continued)

(51) Int. Cl.
| | |
|---|---|
| *H04N 23/45* | (2023.01) |
| *G06T 3/40* | (2006.01) |
| *G06T 7/33* | (2017.01) |
| *G06T 7/37* | (2017.01) |
| *H04N 5/265* | (2006.01) |
| *H04N 23/60* | (2023.01) |
| *H04N 23/61* | (2023.01) |
| *H04N 23/90* | (2023.01) |

(Continued)

(52) U.S. Cl.
CPC .......... *H04N 23/45* (2023.01); *G06T 3/4038* (2013.01); *G06T 7/33* (2017.01); *G06T 7/37* (2017.01); *H04N 5/265* (2013.01); *H04N 23/60* (2023.01); *H04N 23/61* (2023.01); *H04N 23/698* (2023.01); *H04N 23/90* (2023.01); *H04N 25/41* (2023.01); *G06T 2207/10052* (2013.01); *G06T 2207/20061* (2013.01); *G06T 2207/30181* (2013.01)

(58) Field of Classification Search
CPC ........ H04N 23/45; H04N 23/61; H04N 23/90; H04N 23/698; H04N 23/60; H04N 25/41; H04N 5/265; G06T 7/33; G06T 7/37; G06T 3/4038; G06T 2207/10052; G06T 2207/20061; G06T 2207/30181

See application file for complete search history.

(56) References Cited

U.S. PATENT DOCUMENTS

| | | | |
|---|---|---|---|
| 11,108,941 B2 * | 8/2021 | Klosterman | ........... H04N 25/41 |
| 2002/0167655 A1 | 11/2002 | Friedman et al. | |

(Continued)

OTHER PUBLICATIONS

Canadian Office Action; Application No. 3,037,378, dated Apr. 7, 2020, 4 Sheets.

(Continued)

*Primary Examiner* — Twyler L Haskins
*Assistant Examiner* — Fayez A Bhuiyan
(74) *Attorney, Agent, or Firm* — Lewis Roca Rothgerber Christie LLP

(57) ABSTRACT

A plurality of multi-camera systems and methods for imaging faint objects are disclosed, which includes an array of cameras that, when taken alone, are incapable of imaging (Continued)

such objects. The systems and methods may include common field arrays, hybrid field arrays, and/or adaptive field arrays.

20 Claims, 9 Drawing Sheets

Related U.S. Application Data

(60) Provisional application No. 62/396,780, filed on Sep. 19, 2016.

(51) Int. Cl.
*H04N 23/698* (2023.01)
*H04N 25/40* (2023.01)

(56) References Cited

U.S. PATENT DOCUMENTS

| | | |
|---|---|---|
| 2008/0111881 A1 | 5/2008 | Gibbs |
| 2010/0309308 A1 | 12/2010 | Saphier et al. |
| 2011/0198503 A1 | 8/2011 | Koren et al. |
| 2013/0021447 A1 | 1/2013 | Brisedoux et al. |
| 2014/0205155 A1 | 7/2014 | Chung |
| 2015/0363758 A1 | 12/2015 | Wu et al. |
| 2016/0028967 A1 | 1/2016 | Sezer et al. |

OTHER PUBLICATIONS

WIPO Combined International Search Report and Written Opinion; Application No. PCT/US2017/52105; dated Mar. 29, 2018; 11 Sheets.

Australian Government/IP Australia; Examination Report No. 1; Application No. 2017343447; dated Nov. 5, 2019; 4 Sheets.

Australian Government/IP Australia; Examination Report No. 2; Application No. 2017343447; dated Apr. 30, 2020; 4 Sheets.

Van Dokkum, et al.; A High Stellar Velocity Dispersion and ~ 100 Globular Clusters for the Ultra-Diffuse Galaxy Dragonfly 44; The Astrophysical Journal Letters, 828:L6, 6 pps, Sep. 1, 2016.

User Manual: TSync-PCIe PCI Express Time Code Processor With Optional GPS, www.spectracomcorp.com,, Part No. 1191-5000-0050, Manual Revision B, Mar. 12, 2009, 34 pages.

Canadian Office Action dated Mar. 11, 2021, corresponding to Canadian Application No. 3,037,378, 3 pages.

Marshall; Optical Transients in the WASP Survey (Thesis); The University of Warwick, Department of Physics, Sep. 2010, 293 pps.

Kaiser, et al.; Pan-STARRS—a Large Synoptic Survey Telescope Array; Proceedings of SPIE, vol. 4836, © 2002; 13 pps.

\* cited by examiner

MULTI-CAMERA IMAGING SYSTEMS

CROSS-REFERENCES TO RELATED APPLICATIONS

This application is a U.S. Continuation application, which claims priority to and the benefit of U.S. application Ser. No. 16/333,989, filed on Mar. 15, 2019, now U.S. Pat. No. 11,108,941, entitled "MULTI-CAMERA IMAGING SYSTEMS," which claims priority to and the benefit of International Application Serial No. PCT/US17/52105, filed on Sep. 18, 2017, entitled "MULTI-CAMERA IMAGING SYSTEMS," which claims priority to and the benefit of U.S. Provisional Patent Application No. 62/396,780, filed Sep. 19, 2016, entitled "MULTI-CAMERA IMAGING SYSTEMS," the entire contents of each are incorporated herein by reference.

GOVERNMENT LICENSE RIGHTS

This invention was made in part with government support under contract nos. FA9451-14-M-0183 and FA9451-16-C-0406 awarded by the Defense Contract Management Agency. The government has certain rights in the invention.

BACKGROUND

Technical Field

The present invention relates to multi-camera imaging systems, and more particularly, to systems and methods for imaging faint objects with an array of cameras that, when taken alone, are incapable of imaging such objects and/or are considered economical or low-performance.

Description of the Related Art

Limitations on previously existing imaging systems have made imaging objects (e.g., faint objects) in space and other low-light or low-contrast environments a challenge. The sensitivity of a camera is related by the signal-to-noise ratio (SNR) of the image data product. In the context of previously existing imaging systems, the usefulness of any given camera is directly limited by the signal-to-noise ratio it is capable of producing under a given condition.

One mechanism for increasing a camera's ability to produce higher signal-to-noise ratios is by designing the system with larger apertures. Typically, cameras operating with larger apertures would sacrifice the field of view (FOV), due to a finite limit on the size of the focal plane detecting system. Camera systems capable of providing high SNR ratios typically have narrow FOV (e.g., telescopes used for astrophotography). As a result, they are often useless for detecting objects (e.g., faint objects) in space or other low-light environments when the location of a target object is non-static, unpredictable, and/or unknown. Since the FOV is so small, the probability of serendipitously having a target appear in the FOV and thus be detectable is likely very small, unless the position of the target is foreknown to within a certainty of the size of the small FOV. Moreover, existing camera systems capable of producing very high SNR are expensive (e.g., ranging from $100,000 to $100 million or more), due to the cost of designing and precision fabrication of large apertures, complex lenses, advanced image sensors and their cooling systems, and other high-end components. As an example, the DARPA Space Surveillance Telescope (SST), which initially deployed for testing and evaluation in New Mexico, and which was expected to become operational in 2016, is a large, custom monolithic telescope costing over $90 million with an FOV of several degrees. While the DARPA SST may be capable of seeing dim space objects, and has a relatively wide FOV in comparison to telescopes of similar aperture diameter, its FOV is still small and inadequate. That is because, fundamentally, a very large telescope (e.g., over 1 m) can only create an image of several degrees in FOV. And to do so, the SST and other similar systems require making disadvantageously large focal plane detection systems virtually by mosaicking many imaging detectors into the imaging plane of a single monolithic aperture. In the SST, each of these mosaicked focal planes then stares at a slightly different piece of the sky; however, each detector stares through the same monolithic aperture. The SST is not able to use multiple separate imaging systems to exploit the economy of scale or the mass factory-produced and commodity optics. Thus, the known imaging systems, such as the DARPA SST, that rely on the use of several such cameras with the hopeful objective of catching and sufficiently imaging such a target object within a broad composite field of view, are impractical and prohibitively expensive in personal and commercial settings alike.

SUMMARY

As described and illustrated by way of one or more embodiments, multi-camera systems for imaging objects (e.g., faint objects) are provided (e.g., systems and methods for imaging faint objects with an array of cameras that, when taken alone, are incapable of imaging such objects and/or are considered economical or low-performance by those of ordinary skill in the art at the time of the present application's filing). The systems include, by way of example, common field arrays, hybrid field arrays, and/or adaptive field arrays.

Common Field Array

In one or more embodiments, an imaging system includes a plurality of cameras. Each of the cameras is configured to capture an image and has a field of view defining the boundaries of the capturable image. The cameras are configured, adapted, positioned, oriented, arranged, or disposed such that a field of view region is common among the fields of view of the cameras. The imaging system may include, for example, at least five cameras, and the field of view region may be common among at least five of the fields of view of the cameras. The field of view region may be common among all of the fields of view of all of the cameras in the imaging system.

The imaging system includes a computing system communicatively coupled to the cameras. Through the execution of instructions by one or more processors, the computing system is configured to access an image captured by each of the cameras and to co-register the images. The computing system is further configured to combine the images, thereby generating a combined image having a greater signal-to-noise ratio than any of the individual images standing alone. The signal-to-noise ratio of some or all of the combined image may be at least $\sqrt{N}$ times greater than the signal-to-noise ratio of at least one of the individual images standing alone, where N is the quantity of individual images combined.

Hybrid Field Array

In one or more embodiments, an imaging system includes a plurality of camera arrays. Each camera array includes a plurality of cameras each configured to capture an image and having a field of view defining the boundaries of the capturable image. The cameras of each camera array are configured, adapted, positioned, oriented, arranged, or disposed such that the camera array has a common field of view region that is common among the fields of view of the cameras. Each camera array may include, for example, at least five cameras, and the common field of view region may be common among at least five of the fields of view of the cameras. The common field of view region may be common among all of the fields of view of all of the cameras in each array. The common field of view region of each respective camera array partially overlaps the common field of view region of another of the plurality of camera arrays.

The imaging system includes a computing system communicatively coupled to the camera arrays. The computing system is configured to generate from a plurality of captured images of each camera array a combined image having a greater signal-to-noise ratio than any of the images captured by any individual camera of each respective camera array. Through the execution of instructions by one or more processors, the computing system is configured to stitch the combined images together based on the spatial relationship in which the common field of view region of each respective camera array partially overlaps the common field of view region of another of the camera arrays. Thus, the imaging system generates a composite image representing a wider field of view than any combined image standing alone and having a greater signal-to-noise ratio than any individual image captured by any individual camera of the camera arrays. The signal-to-noise ratio of some or all of the composite image may be at least $\sqrt{N}$ times greater than the signal-to-noise ratio of at least one of the individual images captured by one of the individual cameras within one of the camera arrays, where N is the quantity of individual images combined.

Adaptive Field Array

In one or more embodiments, an imaging system includes a plurality of cameras. Each camera is configured to capture an image and has a field of view defining the boundaries of the capturable image. The plurality of cameras are configured, adapted, positioned, oriented, arranged, or disposed such that the fields of view of the cameras collectively form a composite field of view that is greater than any of the fields of view of any of the individual cameras within the plurality of cameras.

The imaging system includes a computing system communicatively coupled to the cameras. The computing system is configured to detect a target object in an image captured by one of the cameras and, in response to detecting the target object, automatically reconfigure, readapt, reposition, reorient, or rearrange the plurality of cameras to produce a common field of view region that is common among the fields of view of the cameras and contains the detected target object. The computing system is further configured to access an image captured by each of the cameras after being reconfigured, readapted, repositioned, reoriented, or rearranged. The computing system is configured to co-register the images and then combine the images, thereby generating a combined image having a greater signal-to-noise ratio than any of the individual images standing alone. The signal-to-noise ratio of some or all of the combined image may be at least $\sqrt{N}$ times greater than the signal-to-noise ratio of at least one of the individual images standing alone, where N is the quantity of individual images combined.

DETAILED DESCRIPTION

Figure 1:
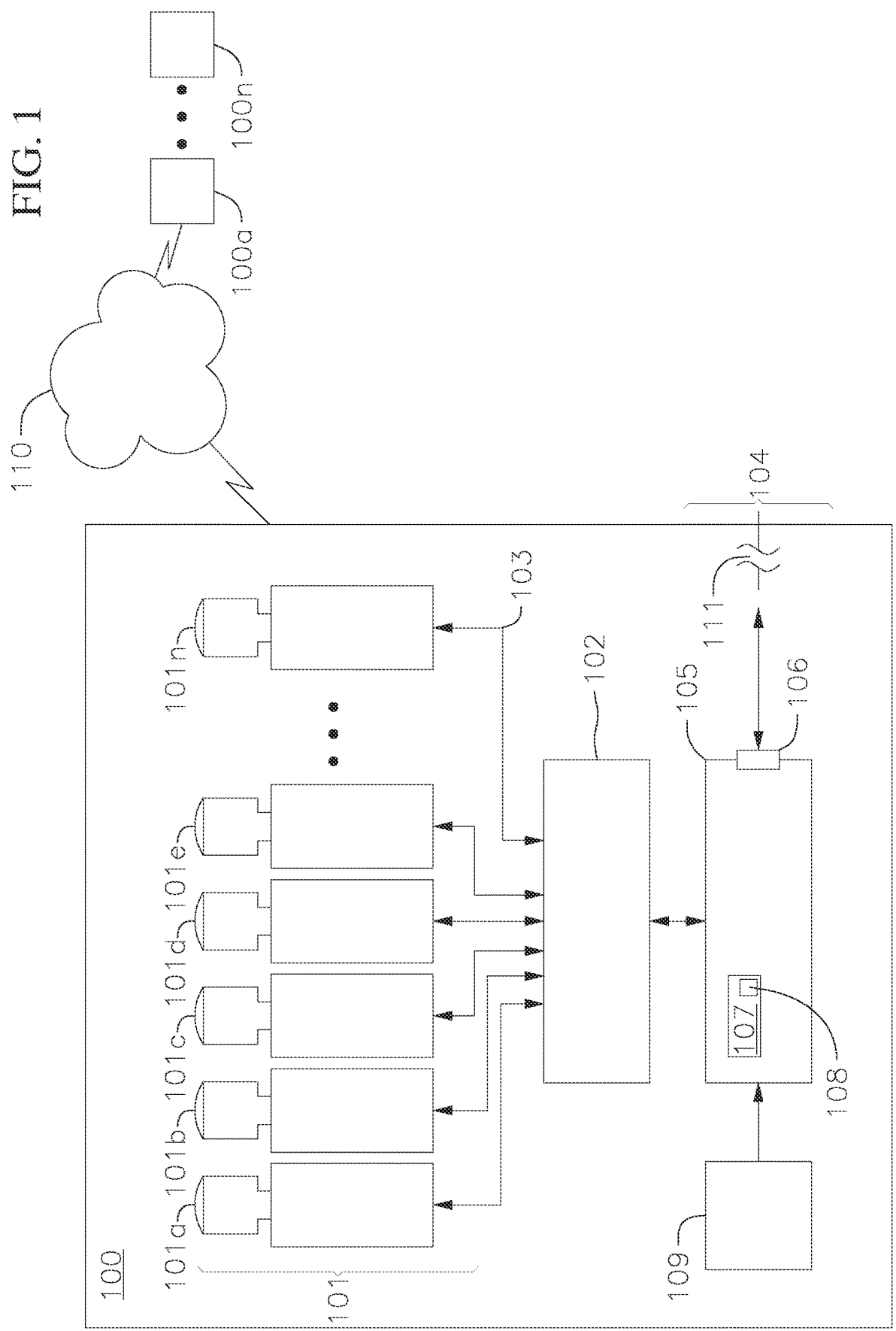
FIG. 1 is, in accordance with one or more embodiments, a block diagram of an exemplary imaging system.

As described and illustrated by way of one or more embodiments, multi-camera systems for imaging objects (e.g., faint objects) are provided (e.g., systems and methods for imaging faint objects with an array of cameras that, when taken alone, are incapable of imaging such objects and/or are considered economical or low-performance by those of ordinary skill in the art at the time of the present application's filing). The one or more embodiments are described for illustrative (i.e., explanatory) purposes only and are not, nor should they be construed as being, exhaustive or otherwise limited to the precise forms illustrated and described. Rather, as those of ordinary skill in the art will readily recognize and appreciate in view of the teachings in this application, additional embodiments and variations are possible in light of, and contemplated by, such teachings. As used in this disclosure, the term "exemplary" means one of many possible non-limiting examples provided for purposes of explanation and illustration. As used herein, the term "exemplary" does not mean preferable, optimal, or ideal, and does not mean that the presence of any elements, components, or steps present in any subject matter referenced as "exemplary" are necessary or required in other possible embodiments or variations of the referenced subject matter. As used herein, the articles "a" and "an" mean one or more unless otherwise stated. For purposes of this disclosure, the terms "comprises," "comprising," "includes," and "including" all mean including, but not limited to, the items, elements, components, or steps listed.

The imaging systems and methods described herein provide numerous technological advances and benefits over previously existing technologies for imaging objects (e.g., faint objects). Such advances and benefits include, for example, the ability to detect and image objects (e.g., faint objects) in space or other low-light environments using cameras that, when taken alone, are incapable of imaging such objects and/or are considered economical or low-performance by those of ordinary skill in the art at the time of the present application's filing (e.g., because they have an insufficient signal-to-noise ratio).

In one or more embodiments, the imaging systems and methods described herein achieve such advances and benefits by combining co-registered images captured by individual cameras (e.g., within a camera array) to generate a combined image having a greater signal-to-noise ratio than any of the individual images standing alone. For purposes of this disclosure, the terms "combine," "combined," and "combining" mean add, sum, stack, superimpose, fuse, or integrate through the use of one or more statistical operations, in addition to other meanings understood by those of ordinary skill in the art in view of the foregoing illustrative meanings and the context in which the terms are used. In one or more embodiments, the signal-to-noise ratio of some or all of the combined image (depending on the size of the common field of view region compared to the size of the individual field of view of each camera) is at least $\sqrt{N}$ times greater than the signal-to-noise ratio of at least one of the images standing alone, where N is the quantity of individual images combined.

The ability to avoid using individual high-performance or highly sensitive cameras (e.g., those capable of imaging low-light targets with higher signal-to-noise ratios, such as imaging wide to ultra-wide fields from about 20 degrees to about 180 degrees angle of view, in less than 0.01 Lux, or for targets or stars with greater than 12 MV stellar magnitudes) provides numerous benefits. Such benefits include, for example, the ability to lower system construction costs (e.g., the initial capital invested in the cameras), operational costs (e.g., the cost of the electricity required to power the system, which also reduces the environmental footprint), and maintenance and repair costs (e.g., the cost of replacing a camera, which may be readily available or "off-the-shelf" as opposed to more expensive and/or more difficult to acquire high-performance cameras). Relatedly, the imaging system also allows users to achieve the foregoing enhancement in image sensitivity without having to alter the optics of the individual cameras (e.g., by replacing the camera lenses to achieve a different focal length).

Other advances and benefits provided by the imaging systems and methods described herein include a reduction in image artifacts caused by cosmic rays, a substantially increased bit depth that achieves the magnitude of data fidelity required to perform advanced deconvolution operations, and enhancements in scalability (e.g., the ability to scale, add, or remove cameras as needed to achieve a desired image sensitivity and/or bit depth) and flexibility (e.g., the ability to reconfigure the cameras from a single-array configuration into a plurality of sub-arrays configurations to image multiple target objects).

One or more embodiments of the imaging systems and methods may be scaled to achieve the desired sensitivity by understanding the sensitivity of a single camera system. The sensitivity of a common field array of several (N) of these camera systems may be described as the square root of N. Thus, if a single camera system is capable of producing a useful SNR, such as SNR=3, on a target of stellar magnitude Mv 12, then a system that is capable of producing a useful SNR on a much dimmer target of stellar magnitude Mv 14 would need an array of approximately 40 of these camera systems. It was found through radiometric mathematics of stellar magnitude and the square root of N improvement that it takes roughly 6.25 cameras being co-added simultaneously to achieve a single Mv increase in sensitivity. Thus, preferably, in one or more embodiments, 6.25 squared number of cameras may be used to achieve a 2 Mv increase in sensitivity.

In one or more embodiments, the cameras may be easily added or removed from the array to tune it, reuse spares or sacrifice failed/failing cameras from the array since each camera produces an independent, realized estimated measurement of the same scene. The array is robust and allows for adding or subtracting an arbitrary number of cameras without significantly sacrificing spatial resolution or FOV; adding or subtracting the cameras primarily results in changing the sensitivity of the array only.

In one or more embodiments, the array construct is also flexible in that the array may be partitioned into a group of "sub-arrays," where each sub-array may include some number of cameras that are all pointed, in a "common field sense," at the same portion of the FOV. Yet each sub-array could be independently steered, i.e., if each sub-array were mounted on an independent pan-tilt actuator or on a gimballed pointing system of its own. In this way, all sub-arrays could be pointed solely at the "common field," e.g., at the same portion of the FOV, or they could be independently steered to dynamically change each FOV and/or the pointing direction, independently from each other sub-array, albeit such independently steered sub-array would be less sensitive than the entire array when considered by itself, separate from the complete array by means of pointing at a different location.

The many technical advances and benefits provided by the systems illustrated and described herein may be employed in any number of possible applications, including astrophotography, deep space searching, geosynchronous and non-geosynchronous satellite detection and tracking, tactical sensing, night vision (e.g., for military and/or law enforcement applications), and other applications that those of ordinary skill in the art will recognize and appreciate in view of the present teachings.

Contrast-challenged targets are targets that may have a large amount of signals, but are presented in clutter or background that also similarly has many targets being present. The difference between the target signal and the background or clutter signal might be very small and require a very highly resolved measurement of the scene in order to discern the fine, subtle variations between the background and the target. Since one or more embodiments of the common field array approach (see below) yields an imaging bit depth that approaches Log 2(N) increase in bit depth, one or more embodiments of the common field array approach may be used to increase the effective bit-depth of an imaging system. For instance, if a very well-designed, well-engineered, high bit-depth sensor has 16 bits of dynamic range "depth" to resolve variations in the field (that is, $2^{16}$ levels of brightness to discriminate changing scene features), then 128 of the same sensitive systems arranged in a common field array implementation would be able to produce 128*($2^{16}$−1) levels of brightness to discriminate the fine, subtle contrast between a target and its background/clutter. This is approaching Log 2(128)=7 enhancement to the bit depth of the system, or approaching 23 bits depth to images produced at the same frame rate and exposure time, using the artful construct of an array, using many of the same systems.

Common Field Array

FIG. 1 is a block diagram of an exemplary imaging system in accordance with one or more embodiments. As illustrated in FIG. 1, the imaging system 100 includes a plurality of imaging devices (e.g., cameras) 101 which, as discussed below, may form various arrays. Illustratively, the cameras may be Basler ACA2040-25 gm-NIR, Basler ACA4112-8 gm or similar offerings, coupled to 1", 1.1" format compatible camera lenses for 2 camera detection systems cited herein, such as Nikon 10.5 mm F/2.8 fisheye lenses, Voigtlander 10.5 mm F/0.95 lenses and/or Kowa 6 mm F/1.8 HC-series ultraWide FOV (UWFOV) lenses.

Other narrower FOV lenses have been tested and shown to be effective, out to 500 mm F/5.0 35 mm format lenses and 35 mm cameras, together capable of providing up to 5 degrees diagonal Angle of View (FOV). Other cameras might include smaller or larger physical formats, such as the 35 mm cameras that have been tested for the arrays of one or more embodiments, and require proper lenses to achieve the proper imaging performance suited to each camera. It has been found that using digital compression, such as the currently extremely popular H.264 video coding schemes, may have deleterious effects on the ability to reliably achieve square root of N enhancement. Thus, preferably, cameras should be chosen to best present "raw," unfiltered, uncompressed detection data, as detecting dim targets and the statistical augmentation relies especially upon the subtle signals hidden in the smallest signal detection changes.

For purposes of this disclosure, the term "camera" includes an image sensor (a pixel sensor, for example) that may comprise a charge-coupled device (CCD), complementary metal oxide semiconductor sensor (CMOS), or any other image sensing device that receives light and generates image data in response to the received image. The imaging device also includes a lens through which light is introduced to the image sensor. In some embodiments, each lens may be a lens assembly that may comprise one or more lens units and an actuator for moving the lens among a number of different lens positions. The actuator may be controlled by a driver. The plurality of cameras may be communicatively coupled to a switch 102 or other multiplexing device compatible with the digital interface of each camera (e.g., an Ethernet switch) through any of a variety of possible data transport links and/or camera interfaces 103 (e.g., a Gigabit Ethernet (GigE) interface, a Universal Serial Bus 3 (USB3) interface, a CameraLink interface, or any other camera interface recognized as suitable by those of ordinary skill in the art). Illustratively, the switch used in one or more embodiments may be Cisco SG-500X-48P, as an example of many existing commodity switches that are affordable and suitable for our purposes. For example, one or more embodiments may employ many (e.g., up to 48) 1 GigE links between the switch and each camera, and up to 4× of the faster 10 GigE SFP+ ports between the switch and the master computer, albeit the exact architecture can be different, tailored to the frame rate and bandwidth requirements of each system realization.

The imaging system further includes a computing system 104 communicatively coupled to the switch or other multiplexing device. The computing system includes a computing device 105 including one or more processors, a communications network interface and/or other types of interfaces 106, a memory 107 (one or more memory devices such as Random Access Memory, nonvolatile memory, etc.), and executable instructions 108 stored in the memory that, when executed, cause the processor to perform a variety of functions (e.g., co-registering images, combining images, stitching images, deconvolving images, and/or other image processing and mathematical operations). The computing device may be a part of a networked system, and some of the embodiments of the invention may be practiced in a distributed computing environment in which the functions are performed by remote processing devices that are linked through the communications network. In a distributed computing environment, the executable functions may be located in the local and remote memory devices. In other embodiments, the computer device may be a standalone device. The computer device is any computerized device having at least one processor. As illustrated in FIG. 1, in one or more embodiments the computing device may be communicatively coupled to a global positioning system (GPS) 109. The GPS may provide coordinate or other geographical data to the computing device for purposes of facilitating co-registration and/or other operations. Illustratively, the GPS used in one or more embodiments may be the Spectracom TSYNC-PCIE.

Although the block diagram of FIG. 1 depicts certain components and connections for illustrative purposes, those of ordinary skill in the art should readily understand and appreciate that other possible components and connections are possible in light of, and contemplated by, the present teachings. Similarly, although the block diagram of FIG. 1 depicts a single imaging system, those of ordinary skill in the art should readily understand and appreciate that a plurality of such imaging systems 100a-n may be employed in a networked or otherwise connected fashion in which the systems communicate directly with one another or through a central computerized control system 110.

Figure 2:
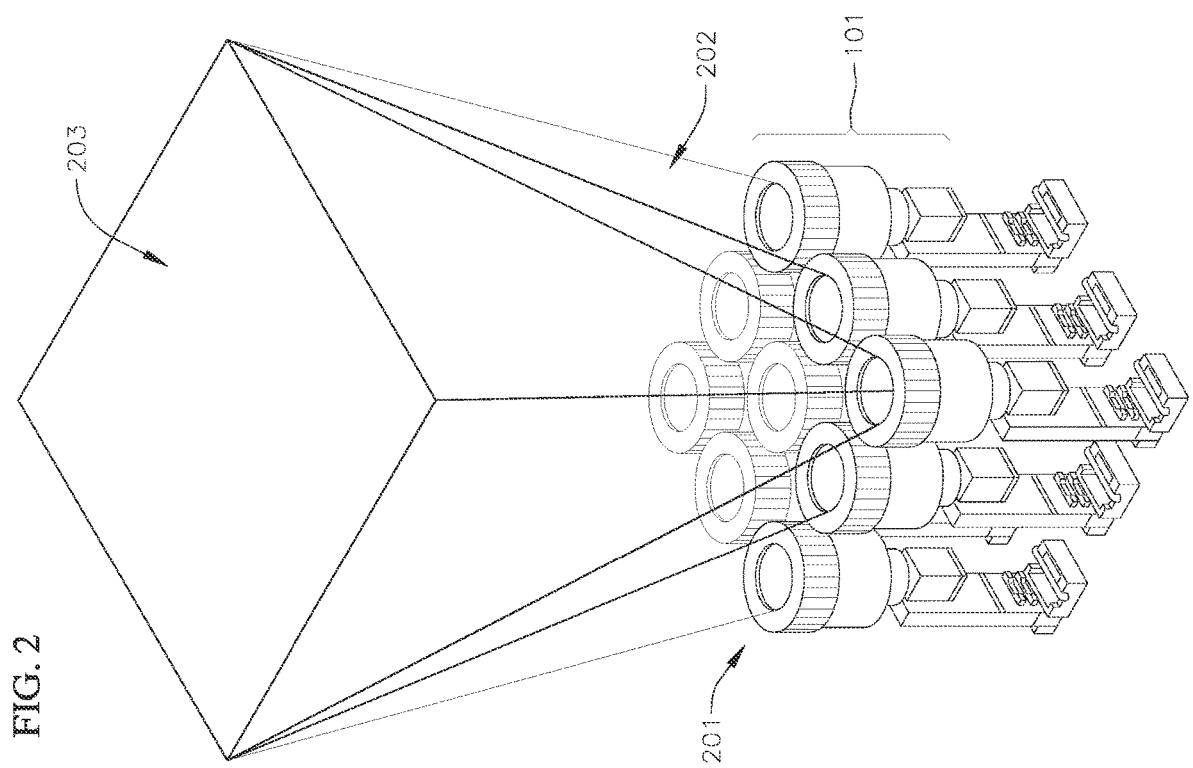
FIG. 2 illustrates, in accordance with one or more embodiments, a common field array of an exemplary imaging system.

FIG. 2 illustrates, in accordance with one or more embodiments, an exemplary common field array 201 of an imaging system 100. For purposes of this disclosure, the term "common" does not mean ordinary, unsophisticated, or frequently occurring, but rather means defining the same spatial region, superimposed, joint, shared, stacked, and other meanings understood by those of ordinary skill in the art in view of the foregoing illustrative meanings and the context in which the term is used in this application. As illustrated in FIG. 2, in one or more embodiments an imaging system 100 includes a plurality of cameras each configured to capture an image. For purposes of this disclosure, the term "image" means a digital image, a digital representation of an image, and/or digital data representing an image, including, for example, raster type images, vector type images, and other forms of digital images appreciated by those of ordinary skill in the art in view of the foregoing examples.

The cameras 101 may be monolithic, cooled or uncooled 2-D area cameras of CMOS, CCD, Avalanche Photodiode Arrays, linear or multi-linear arrays, scanned in 1-dimension of either direct or time-delay integration readout constructs; single or multi-element 2 directionally scanned sensors or other cameras recognized as suitable by those of ordinary skill in the art. Each of the cameras has a field of view 202 that defines the boundaries of a capturable image. The field of view of each camera may be any angle recognized as suitable by those of ordinary skill in the art. In one or more embodiments, for example, the field of view may range from about 0.15 square arc-minutes to about 30 square degrees, or from about 1-degree horizontal to about 180 degrees horizontal.

In one or more embodiments, the plurality of cameras 101 are configured, adapted, positioned, oriented, arranged, or disposed such that a field of view region is common among the fields of view of the plurality of cameras (common field of view region 203). In one or more embodiments, the elegance and simplicity of changing the number of cameras in a common field array is that the system can be expanded or collapsed to smaller or greater number of cameras with almost no hardware, architectural, or design changes. The software system will recognize the number of cameras in the array and scale the final imaging product to include all useful information sources. As the greater number of systems start to saturate the amount of data or the speed at which a single master computer can handle many camera data feeds coming into it, a hierarchical pyramid of arrays of multiple common field arrays may be created, i.e., a common field array of common field arrays. For instance, a single computer and network switch may usefully integrate at least 20 cameras and up to 48 cameras. Preferably, a single computer and two network switches may accommodate up to 96 cameras in one or more embodiments of the array. Thus, to create an array of 960 cameras, one may assemble 10×96 camera arrays and have each computer that handles 96 cameras to create a single image product. The foregoing process may be replicated 10 times and fed into another common field array master computer that treats each 96-camera array as if it were a single camera, co-registering them together and combining their images into, ultimately, a 960-camera array (of arrays).

Figure 3:
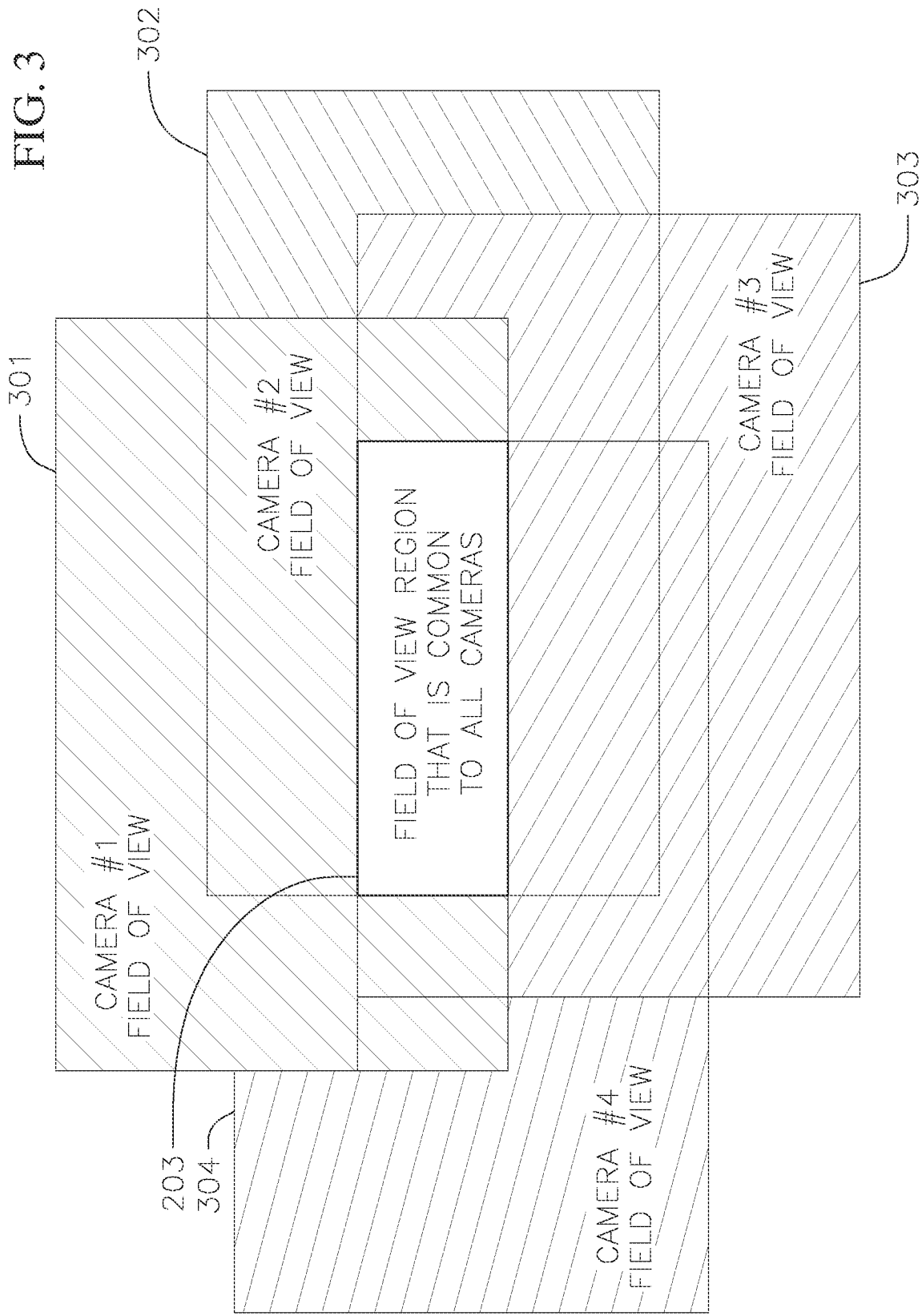
FIG. 3 illustrates, according to one or more embodiments, a field of view region that is common among the fields of view of the plurality of cameras of an exemplary imaging system.

The imaging system may include any number of cameras as dictated by the desired imaging objective. FIG. 3 illustrates, according to one or more embodiments, a field of view region that is common among the fields of view of the plurality of cameras in an exemplary imaging system (common field of view region 203). As illustrated in FIG. 3, in one or more embodiments, the imaging system 100 may include at least four cameras, and the common field of view region 203 may be common among at least four of the fields of view of the cameras. In one or more embodiments, the imaging system 100 may include at least five cameras, and the common field of view region 203 may be common among at least five of the fields of view of the cameras. In one or more embodiments, the imaging system 100 may include at least six cameras, and the common field of view region 203 may be common among at least six of the fields of view of the cameras. In one or more embodiments, the field of view region 203 is common among all of the fields of view of all of the cameras (see, e.g., the common field arrays illustrated in FIGS. 2 and 3).

The field of view region 203 that is common among the fields of view of the cameras may vary in size depending on the fields of view of the cameras and the manner in which the cameras are configured, adapted, positioned, oriented, arranged, or disposed. Thus, the common field of view region 203 may overlap portions of each field of view of the individual cameras (e.g., 301 through 304, as illustrated in FIG. 3), or the common field of view region 203 may overlap all or substantially all of each field of view of the individual cameras (as illustrated in FIG. 2). In one or more embodiments, all of the cameras may be pointed in the same or substantially the same direction. The cameras may, alternatively, be pointed in different directions with respect to one another as required to produce the common field of view region among the fields of view of the cameras.

By way of example, the plurality of cameras may include a first camera having a first field of view, a second camera having a second field of view, and a third camera having a third field of view. The cameras may be configured, adapted, positioned, oriented, arranged, or disposed such that at least a portion of the field of view of the first camera defines the same spatial region as a portion of the field of view of the second camera, thereby creating a field of view region that is common between the first camera and the second camera. The cameras may further be configured, adapted, positioned, oriented, arranged, or disposed such that at least a portion of the field of view of the third camera defines the same spatial region as the field of view region that is common between the first camera and the second camera, thereby creating a field of view region that is common between the first camera, the second camera, and the third camera.

In one or more embodiments, the plurality of cameras may further include a fourth camera having a fourth field of view. The cameras may be further configured, adapted, positioned, oriented, arranged, or disposed such that at least a portion of the field of view of the fourth camera defines the same spatial region as the field of view region that is common between the first camera, the second camera, and the third camera, thereby creating a field of view region that is common between the first camera, the second camera, the third camera, and the fourth camera.

In one or more embodiments, the plurality of cameras may further include a fifth camera having a fifth field of view. The cameras may be further configured, adapted, positioned, oriented, arranged, or disposed such that at least a portion of the field of view of the fifth camera defines the same spatial region as the field of view region that is common between the first camera, the second camera, the third camera, and the fourth camera, thereby creating a field of view region that is common between the first camera, the second camera, the third camera, the fourth camera, and the fifth camera.

In one or more embodiments, some or all of the cameras in the imaging system are co-located (as illustrated in FIG. 2). The co-located cameras may reside directly adjacent to one another (e.g., abut one another), or they may be separated by a short distance (e.g., between about 1 cm and about 5 cm, between about 1 cm and about 10 cm, or between about 1 cm and about 100 cm). In one or more embodiments, the co-located cameras may be stored in a cabinet or other housing to minimize the overall footprint of the imaging system, to conceal the imaging system, to control the temperature affecting the imaging system, and/or to protect the imaging system from tampering and environmental damage. The cabinet may include a computer-controlled retractable cover, a positive-pressure ventilation system, and/or other elements to minimize the occurrence of dust or other contaminants landing on the camera lenses.

In one or more embodiments, some or all of the cameras in the imaging system may be geographically or spatially dispersed (i.e., not co-located). The plurality of cameras may be geographically or spatially separated, for example, by at least 3 meters, by at least 10 meters, by at least 100 meters, by at least a kilometer, or by hundreds or thousands of kilometers (e.g., dispersed throughout the United States or the world). When geographically or spatially separated, the cameras may be communicatively coupled to the computing device by a communications network (e.g., a local area network, a wide area network, or a mobile or other satellite-based network, any of which may be private or public). In one or more embodiments, the geographically or spatially separated cameras of the imaging system may be individually controlled by different people or entities and, through coordinated targeting, the imaging system may access (i.e., effectively "crowdsource") the individual images captured by the cameras.

Although the exemplary array illustrated in FIG. 2 includes nine cameras 101, those of ordinary skill in the art should readily appreciate that any other plural quantity of cameras 101 are possible in light of, and contemplated by, the scope of present teachings. Moreover, although the exemplary array illustrated in FIG. 2 includes cameras 101 that are configured, adapted, positioned, oriented, arranged, or disposed so as to form a square matrix, those of ordinary skill in the art should readily appreciate that other geometric arrangements or configurations of the cameras 101 are possible in light of, and contemplated by, the present teachings (e.g., non-square rectangular matrices, circular arrangements, semi-circular arrangements, triangular arrangements, or other polygonal or irregular shaped arrangements). The choice of geometric arrangement or configuration may depend on numerous factors, including camera design, camera performance, the spatial relationship between individual cameras, the space available to accommodate the camera array, cost considerations, weight considerations, and other factors appreciable by those of ordinary skill in the art in view of the present teachings.

The imaging system 101 includes a computing device 105 communicatively coupled to the cameras 101. The computing device 105 may be communicatively coupled to the cameras 101 through one or more intermediate computing devices, such as a switch 102 or other multiplexing device(s) as illustrated in FIG. 1. The computing device 105 is configured to receive or otherwise access the image captured by each of the cameras 101. The images may be stored locally within memory 107 (which may reside in or connect to the cameras 101 or the computing device 105), or the images may be stored in a remote storage device, such as a database server and/or web server communicatively coupled to the computing device 105 by a communications network (e.g., a local area network, a wide area network, or a mobile or other satellite-based network, any of which may be private or public).

The computing device 105 is further configured to co-register the images. Co-registering the images may include aligning the images such that a common reference object occupies the same pixel locations within each image. Aligning the images may include computing one or more spatial transformations. In one or more embodiments, co-registering the images includes identifying a common reference object present within each of the images. When available, multiple common objects may be used as a reference framework. The common object present within each of the images may be, for instance, a star or other object in space, while a set of multiple common objects may be some or all of a known constellation. Co-registering the images may include determining a coordinate location of the common object within each image.

The coordinate location may be identified through the use of a computerized coordinate atlas or star catalog, such as the Yale Bright Star catalog, the Henry Draper catalog, the U.S. Naval Observatory catalog, or any other coordinate atlas or star catalog recognized as suitable by those of ordinary skill in the art. In one or more embodiments, the computing device 105 may be configured to automatically determine the coordinate location of the common object through the use of such a computerized star catalog and/or star matching software.

In some embodiments, the spatial transformations may be determined "on the fly" or in real-time for each set of images captured by the plurality of cameras. In one or more embodiments, rather than calculating the spatial transformations for every set of images, the same transformations may be used repeatedly (e.g., up until thermal effects or vibrational issues cause the transformations to become inaccurate). In other cases (e.g., those with high thermal and dimensional stability), the transformations may be determined apriori in a calibration process.

Figure 4:
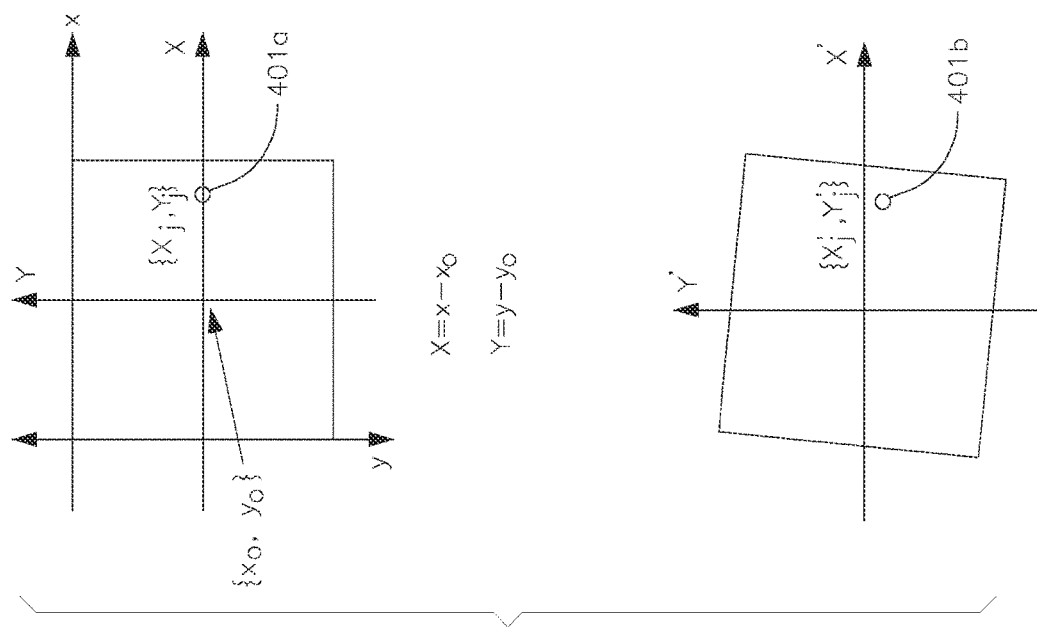
FIG. 4 illustrates, in accordance with one or more embodiments, a co-registration operation that a computing device of an exemplary imaging system is configured to perform.

The spatial transformations may include the use of a coordinate transformation operation or other mathematical operations recognized as suitable by those of ordinary skill in the art. FIG. 4 illustrates, in accordance with one or more embodiments, an exemplary co-registration operation using a coordinate operation. As illustrated in FIG. 4, the top and bottom graphics each depict a point representing a target object, 401a, 401b (e.g., a star, a manmade object such as a satellite, or any other object in space). In the top image, the target object 401a is located at position $\{X_i, Y_j\}$. In the bottom image, the target object 401b is located at $\{X'_i, Y'_j\}$. The positions may be related by the following polynomials handling translation, rotation, and scaling:

$$X'_j = f(X_j, Y_j) = a_1 + a_2 X_j \quad Y'_j = g(X_j, Y_j) = b_1 + b_2 X_j$$
$$+ a_3 Y_j \qquad\qquad\qquad\qquad + b_3 Y_j$$
$$+ a_4 X_j Y_j \qquad\qquad\qquad + b_4 X_j Y_j$$
$$+ a_5 X_j^2 \qquad\qquad\qquad\qquad + b_5 X_j^2$$
$$+ a_6 Y_j^2 \qquad\qquad\qquad\qquad + b_6 Y_j^2$$
$$+ a_7 X_j^2 Y_j \qquad\qquad\qquad + b_7 X_j^2 Y_j$$
$$+ a_8 X_j Y_j^2 \qquad\qquad\qquad + b_8 X_j Y_j^2$$
$$+ a_9 X_j^3 \qquad\qquad\qquad\qquad + b_9 X_j^3$$
$$+ a_{10} Y_j^3, \qquad\qquad\qquad + b_{10} Y_j^3.$$

The above polynomials may be written in the following matrix notation:

$$\overline{X'} = \overline{\overline{F}} \overline{a}, \text{ and}$$

$$\overline{Y'} = \overline{\overline{F}} \overline{b}.$$

where $$\overline{X'} = \begin{bmatrix} X'_1 \\ X'_2 \\ \vdots \\ X'_N \end{bmatrix} \quad \overline{a} = \begin{bmatrix} a_1 \\ a_2 \\ \vdots \\ a_n \end{bmatrix} \quad \overline{b} = \begin{bmatrix} b_1 \\ b_2 \\ \vdots \\ b_N \end{bmatrix}$$

and $$\overline{\overline{F}} = \begin{bmatrix} 1 & X_1 & Y_1 & X_1 Y_1 & X_1^2 & Y_1^2 & \cdot & Y_1^3 \\ 1 & X_2 & Y_2 & X_2 Y_2 & X_2^2 & Y_2^2 & \cdot & Y_2^3 \\ 1 & X_N & Y_N & X_N Y_N & X_N^2 & Y_N^2 & \cdot & Y_N^3 \end{bmatrix}$$

The coefficient vectors, $\overline{a}$ and $\overline{b}$, may be found using linear least squares techniques or other mathematical techniques recognized as suitable by those of ordinary skill in the art. As a result, one image may be registered to another (i.e., the two images may be co-registered). The foregoing co-registration process may be repeated for all of the images captured by each camera 101, which in turn produces aligned or substantially aligned images that, as discussed below, may be combined to achieve at least a $\sqrt{N}$ times improvement in signal-to-noise ratio. In one or more embodiments, the computing system 100 is configured to identify the field of view region 203 that is common among the fields of view of the plurality of cameras. Identifying the field of view region 203 that is common among the fields of view of the plurality of cameras may be based on the co-registration of the images.

In one or more embodiments, the cameras 101 are configured to capture their respective images simultaneously. As used in this disclosure, the term "simultaneously" does not mean that the referenced events must occur at exactly the same time, but rather means that the referenced events occur either at the same time or within a reasonable margin of variation or error as appreciated by those of ordinary skill in the art. Capturing the images simultaneously, or as close to simultaneously as possible given inherent margins of error and other variations, increases the effectiveness of combining the co-registered images. As those of ordinary skill in the art will understand and appreciate, other co-registration methods in addition to those described herein for illustrative purposes may be utilized and are contemplated within the scope of the present teachings.

The computing system 101 is further configured to combine the co-registered images, thereby generating a combined image having a greater signal-to-noise ratio than any of the individual images standing alone. For purposes of this disclosure, the terms "combine," "combined," and "combining" mean add, sum, stack, superimpose, fuse, or integrate through the use of one or more statistical operations, in addition to other meanings understood by those of ordinary skill in the art in view of the foregoing illustrative meanings and the context in which the terms are used. In one or more embodiments, the signal-to-noise ratio of some or all of the combined image (depending on the size of the common field of view region) is at least $\sqrt{N}$ times greater than the signal-to-noise ratio of at least one of the individual images standing alone, where N is the quantity of individual images combined.

When detecting photons in a well-designed and calibrated electro-optical system, the dominant source of noise is the fluctuation in the arrival rate of photons. For a given time interval, the probability of detecting κ photons is given by the following Poisson distribution where λ is the mean of the distribution:

$$P(k) = \frac{\lambda^k e^{-\lambda}}{k!},$$

One property of the Poisson distribution is that the variance is also given by λ and the standard deviation, σ; is then given by $\sigma = \sqrt{\lambda}$. As illustrated in the following equation, the signal-to-noise ratio (SNR) is defined to be the mean of the signal divided by the standard deviation of the variation in the signal:

$$SNR = \frac{\lambda}{\sigma}$$

For the Poisson distribution, this simply reduces to:

$$SNR = \frac{\lambda}{\sqrt{\lambda}} = \sqrt{\lambda}$$

Combining N samples (e.g., individual images captured by an individual camera within the common field array), the expected signal will then be given Nλ and the signal-to-noise ratio will be given by:

$$SNR_N = \frac{N\lambda}{\sqrt{N\lambda}} = \sqrt{N\lambda}$$

Thus, the $SNR_N$ for N combined images is simply $\sqrt{N}$ times the SNR, $\sqrt{\lambda}$, of an individual image.

By way of example, in one or more embodiments in which the imaging system features four cameras, each of which captures an individual image with a signal-to-noise ratio of 10 (generally considered by those of ordinary skill in the art as being of minimal quality), the enhanced signal-to-noise ratio of some or all of the combined image may be determined by the expression $10\sqrt{4}$, or 20 (approaching an image considered useful for astronomical images by those of ordinary skill in the art). Similarly, in an exemplary embodiment in which the imaging system features thirty-six cameras, each of which captures an individual image with a signal-to-noise ratio of 10, the enhanced signal-to-noise ratio of some or all of the combined images would be $10\sqrt{36}$ or 60 (considered very good by those of ordinary skill in the art).

As discussed above, the field of view region 203 that is common among the fields of view of the cameras may vary in size depending on the fields of view of the cameras and the manner in which the cameras are configured, adapted, positioned, oriented, arranged, or disposed. Thus, the common field of view region 203 may overlap portions of each field of view of the individual cameras (e.g., 301 through 304, as illustrated in FIG. 3), or the common field of view region 203 may overlap all or substantially all of each field of view of the individual cameras (as illustrated in FIG. 2). In the latter case, a larger portion of the image captured by each of the individual cameras 101 is enhanced by the $\sqrt{N}$ signal-to-noise ratio multiplier.

The significant increase in signal-to-noise ratio and resulting image sensitivity or quality of some or all of the combined image generated using the common field array 201 compared to any individual camera 101 within the array permits the imaging system 100 to detect and/or image objects (e.g., faint objects) in space or other low-light environments without having to rely on expensive, high-performance cameras and despite the fact that each individual camera 101 in the array 201 is, when taken alone, incapable of detecting and/or imaging such objects.

In one or more embodiments, the imaging system 100 provides separate benefits in addition to providing enhanced signal-to-noise ratio (e.g., the ability see dimmer targets). One such additional benefit is the ability to harness a substantially increased bit depth and, through the use of the increased bit depth, collect an amount of data required to perform advanced deconvolution operations that each individual camera 101 in the imaging system 100, when taken alone, is incapable of collecting due to limitations in bit depth.

Deconvolution is a process that is useful for recovering a pristine image from a blurred image. Deconvolution is limited, however, by both the amount of data available in the blurred image and the bit depth of the imaging system capturing the blurred image. The bit depth of a camera determines how many discrete intensities of light (e.g., shades of gray) the camera can resolve. The quantity of resolvable intensities increases according to the equation # resolvable intensities=$2^N$, where N is the number of bits, aka the "bit depth" of the image sensor of the camera. Thus, an 8-bit camera can resolve 256 different intensities of light (i.e., shades of gray) ranging from values of 0, which represents black, to 255. A 16-bit camera can resolve 65,536 different intensities of light ranging from values of 0 to 65,535. In one or more embodiments, the imaging system 100 described herein may, by increasing the overall available bit depth of an imaging system 100, increase the amount of data that can be collected from a blurred image. The use of one or more embodiments of the imaging system 100 described herein may, for instance, increase a bit depth from 10 or 14 bit depth (as might be found within the digital camera of an "off the shelf" or conventional telescope considered economical or low-performance by those of ordinary skill in the art at the time of the present application's filing) to a significantly larger bit depth capable of collecting more information about an unresolved target from a blurred image. For example, in one or more embodiments, an array constructed of 1024 cameras of 14 bit depth each will result in the ability to resolve the brightness of the measured image radiance to 16,776,192 individual levels, which is an effective bit depth of 23.9999, or almost identically 14 bits plus Log base 2 of the 1024 number in the array, or "10" additional bits of energy resolution.

In one or more embodiments, the imaging system 100 will increase the available bit depth according to the equation Log base 2 (M*(2^N−1)), where M is the number of cameras 101 in the array 201 and N is the bit depth of the camera device 101. This bit depth is slightly less than but almost equal to Log base 2 (M)+N. Thus, the bit depth of the aggregate array 201 is essentially increased by Log 2 of the size of the array 201. The imaging system 100 may, for instance, be configured or adapted to, or otherwise made capable of, natively providing datasets that are $2^{36}$ bit depth or of other magnitudes that have not been achievable with previously existing imaging systems. In one or more embodiments in which the imaging system 100 includes four 10-bit cameras 101, the overall or aggregate bit depth may be increased to approximately 12 bits, i.e., Log base 2 (4×255). Moreover, the ability of the imaging system 100 to increase signal-to-noise ratio in and of itself further enhances the deconvolution process because the efficacy of deconvolution increases as signal-to-noise ratio increases.

Having captured an increased amount of data through the use of an increased overall bit depth, the imaging system 100 may produce an image carrying the requisite information needed to perform advanced deconvolution operations (e.g., blind deconvolution and other methods of deconvolution that cannot be performed using cameras 101 that, when taken alone, are incapable of collecting sufficient data about the unresolved target and/or are considered economical or low-performance by those of ordinary skill in the art at the time the present application is filed). By making advanced deconvolution and other advanced signal processing and mathematical operations possible—in addition to the increase in signal-to-noise ratio described herein—the imaging system 100 further increases the probability of recovering a pristine image from a blurred image. Thus, one or more embodiments of the imaging system 100 may provide a dramatic improvement in the ability to resolve targets when compared to previously existing imaging systems or to the individual cameras 101 of the imaging system 100 when taken alone.

Another separate technological advance and benefit provided by one or more embodiments of the imaging system 100 (in addition to the provision of enhanced signal-to-noise ratio) is a reduction in image artifacts caused by cosmic rays. When using a single camera with a high signal-to-noise ratio (e.g., a single shot-noise-limited camera recognized by those of ordinary skill in the art as astronomy-grade and having high image sensitivity), an artifact may appear in a captured image if a cosmic ray happened to penetrate the focal plane of the camera at the time the image was captured. The artifact may appear, for example, as a streak. When conducting deep space target searching or otherwise attempting to detect and/or image objects (e.g., faint objects), such artifacts can make it difficult to confirm the true presence of a target object. In one or more embodiments of the imaging system 100 described herein, the effect of such cosmic rays is greatly reduced by virtue of the common field of view region 201. Namely, a cosmic ray would need to simultaneously penetrate the focal plane of a majority or all of the cameras 101 of the imaging systems 100 described herein in order to remain visible after the individual images captured by the cameras 101 are combined. The probability of such an occurrence is extremely low. Where a cosmic ray penetrates the focal plane of only a single camera 101 within the imaging system 100, on the other hand, any artifact produced within the single image captured by that single camera 101 will effectively be "washed out" or outweighed once combined with the images captured by the other cameras 101 in the imaging system 100.

Hybrid Field Array

Figure 5:
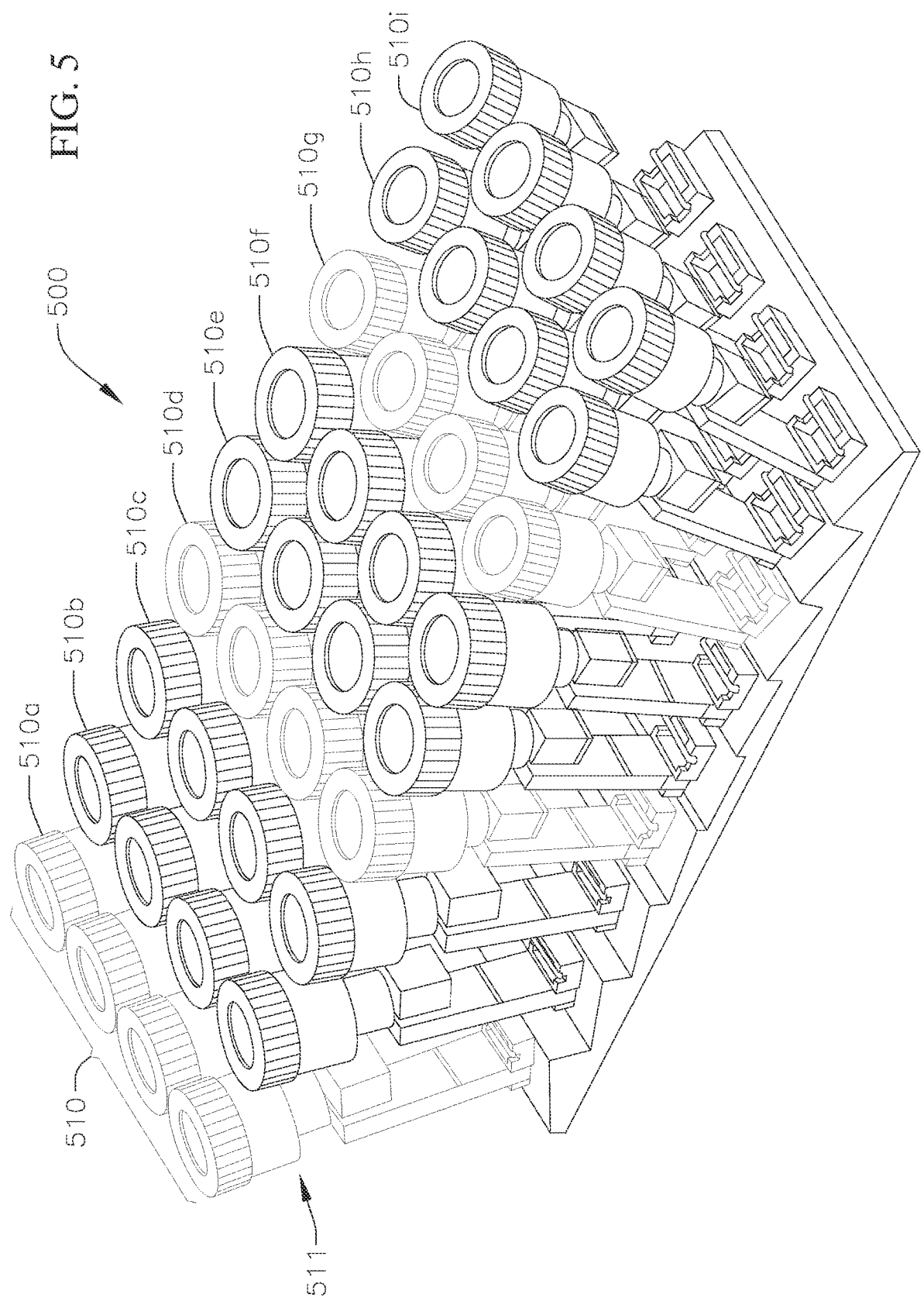
FIG. 5 illustrates, in accordance with one or more embodiments, a hybrid field array of an exemplary imaging system.

FIG. 5 illustrates, in accordance with one or more embodiments, a hybrid field array 500 of an exemplary imaging system 100. As illustrated in FIG. 5, in one or more embodiments an imaging system 100 includes a plurality of camera arrays 500. Each camera array 510 includes a plurality of cameras 511. Each camera 511 is configured to capture an image and has a field of view defining the boundaries of the capturable image. Each camera array 510 within the plurality of camera arrays 500 has a common field of view region that is common among the fields of view of the cameras 511 in that respective common field camera array 510. In one or more embodiments, the common field of view region of each respective camera array 510 may partially overlap the common field of view region of another (e.g., adjacent or proximate) camera array 510.

The imaging system 100 further includes a computing device communicatively coupled to the plurality of camera arrays 500. Depending on the required and available processing power, memory, bandwidth, and other computing considerations, in one or more embodiments the imaging system 100 may include either a single computing device 105 communicatively coupled to each of the camera arrays 510, or a plurality of computing devices 105 each communicatively coupled to one or more of the camera arrays 510. Relatedly, it should be understood and appreciated by those of ordinary skill in the art that descriptions of various functions executable by "the computing device" may be executed by a single computing device, or may be distributed or replicated across a plurality of computing devices (e.g., for efficiency, redundancy, or other purposes).

The computing device 105 is configured to generate a combined image from the images captured by each of the cameras in each camera array 510 (i.e., captured by the plurality of cameras 511 within each camera array 510). In one or more embodiments, the combined image from each array 510 has a greater signal-to-noise ratio than any of the individual images captured by any individual camera 511 of each respective camera array 510 standing alone. As discussed above with respect to the common field array 201, in one or more embodiments the signal-to-noise ratio of some or all of the combined image (depending on the size of the common field of view region) is at least $\sqrt{N}$ times greater than the signal-to-noise ratio of at least one of the images standing alone, where N is the quantity of images combined. In one or more embodiments, generating the combined image may include the individual cameras 511 within each respective camera array 510 capturing their respective images simultaneously with respect to one another. Generating the combined image may also include the cameras 511 within the imaging system 100 capturing their respective images simultaneously across all of, or a subset of, the plurality of camera arrays 500.

In one or more embodiments, generating the combined image includes co-registering the images captured by the plurality of cameras 511 within each respective camera array 510. Generating the combined image may also include co-registering the images captured by the plurality of cameras 511 across all of, or a subset of, the plurality of camera arrays 500. Co-registering the images may include aligning the images such that the common object occupies the same pixel locations within each image. Aligning the images may include computing one or more spatial transformations for each image as discussed above with respect to the common field array 201. In one or more embodiments, generating the combined image may include identifying the field of view region that is common among the fields of view of the plurality of cameras of each respective camera array. Identifying the field of view region that is common among the fields of view of the plurality of cameras 511 of each respective camera array 510 may be based on the co-registration of the images.

Further referring to FIG. 5, in one or more embodiments, the computing device 105 is further configured to stitch the plurality of combined images together (e.g., to stitch a first combined image from a first common field array 510a to a second combined image from a second common field array 501b, which itself may be stitched to a third combined image from a third common field array 510c, and so on). The computing device 105 may perform the stitching operation based at least in part on the spatial relationship in which the common field of view region of each respective camera array 510 partially overlaps the common field of view region of another 510 of the plurality of camera arrays 500. By stitching together the plurality of combined images based on the spatial relationship in which the common field of view region of each respective camera array 510 partially overlaps the common field of view region of another 510 of the plurality of camera arrays 500, the computing device 105 may generate a stitched or composite image representing a wider field of view than any combined image standing alone. Moreover, by combining the images captured within the field of view region that is common among the fields of view of the plurality of cameras 511 of each respective camera array 510, some or all of the composite image may have a greater signal-to-noise ratio than any of the individual images captured by individual cameras 511 of each respective camera array 510 standing alone.

One or more embodiments of the imaging system 100 described herein may be particularly beneficial for imaging geosynchronous satellites. Moreover, because the imaging system 100 may be used to generate a composite image of any desired dimensions by reconfiguring, rearranging, readapting, repositioning, or reorienting the position of the camera arrays, the imaging system 100 may be configured, arranged, adapted, positioned, oriented, or disposed so as to image a desired "strip" of space, such as the known pathway in which a particular satellite or other target object travels (e.g., orbits).

Adaptive Field Array

Figure 6:
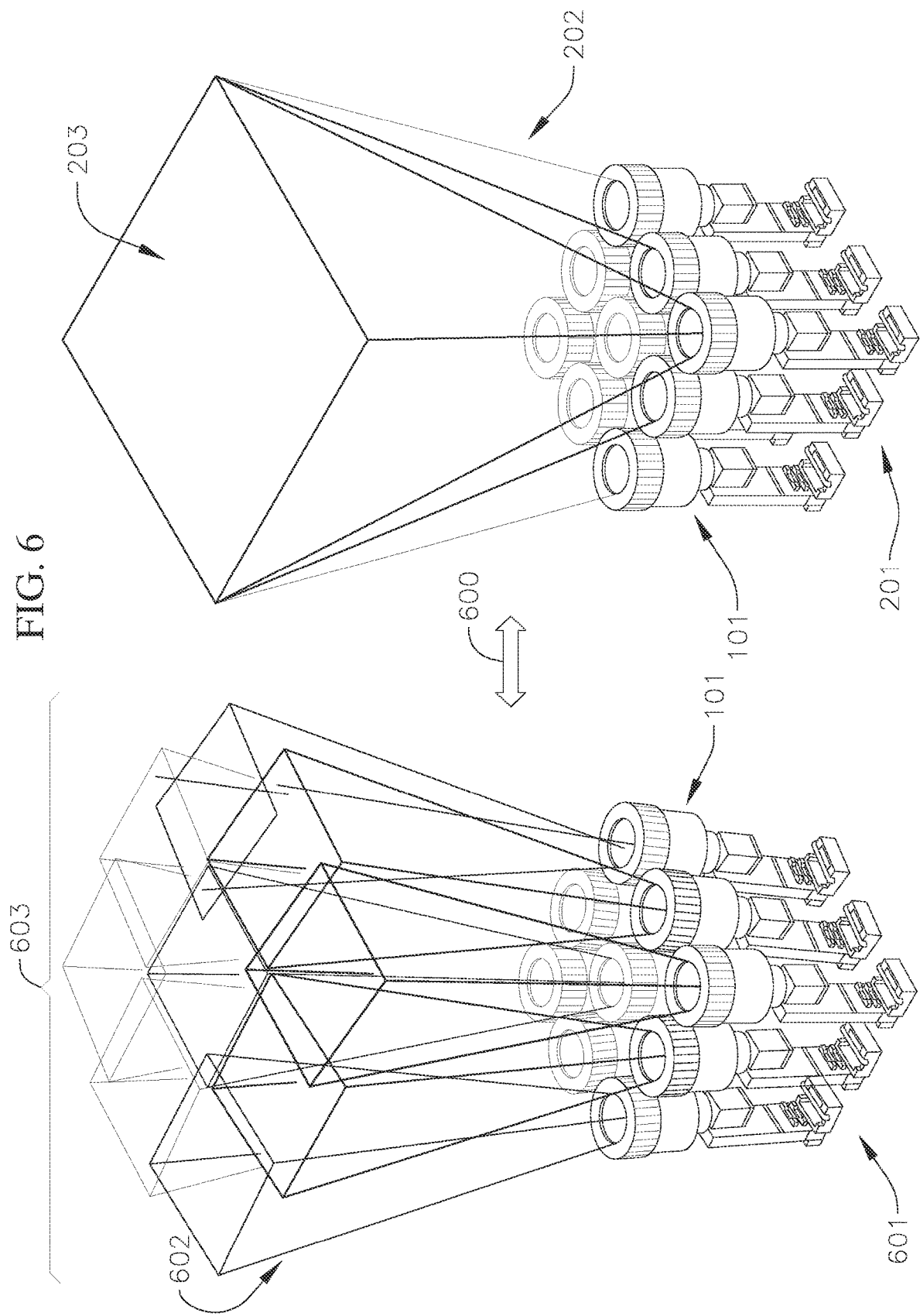
FIG. 6 illustrates, in accordance with one or more embodiments, an adaptive field array of an exemplary imaging system.

FIG. 6 illustrates, in accordance with one or more embodiments, an adaptive field array 600 of an exemplary imaging system 100. As illustrated in FIG. 6, one or more embodiments of an imaging system 100 include a plurality of cameras 101. Each camera 101 is configured to capture an image and has a field of view defining the boundaries of the capturable image. The cameras 101 may be configured, arranged, adapted, positioned, oriented, or disposed so as to form a camera array. In one or more embodiments, the plurality of cameras 101 may be configured, arranged, adapted, positioned, oriented, or disposed in a variety of spatial configurations and may be reconfigurable, in an automatic, triggered, or otherwise computer-controlled manner, between the variety of spatial configurations. The plurality of cameras 101 may be configured, for instance, in a first configuration 601 in which the fields of view of the cameras 602 collectively form a stitched or composite field of view 603 that is greater than any of the fields of view 602 of any of the individual cameras standing alone. The cameras may also be configured, for example, in a second configuration 201 in which a field of view region 202 is common among the fields of view of the cameras and the detected target object is positioned within the common field of view region 203.

The imaging system 100 includes a computing device 105 communicatively coupled to the cameras 101. In one or more embodiments, the computing device 105 is configured to detect the target object in at least one image captured by one of the cameras 101 and, in response to the detection, automatically reconfigure, readapt, reposition, reorient, or rearrange (e.g., by physically moving their spatial location with respect to the target object) some or all of the plurality of cameras 101 from the first configuration 601 to the second configuration 201. Once the imaging system has reconfigured some or all of the cameras 101 from the first configuration 601 to the second configuration 201, the imaging system 100 may then generate a combined image of the detected target as described above. In one or more embodiments, the signal-to-noise ratio of some or all of the combined image is at least $\sqrt{N}$ times greater than the signal-to-noise ratio of at least one of the individual images standing alone, where N is the quantity of individual images combined. The reconfiguration, readapting, repositioning, reorientation, or the rearrangement can be likened to a sea-anemone's actions. When the anemone is in "target" (aka "food") detection mode, the arms of the anemone are detecting equally in nearly every direction, spread out over many angles, so as to increase its volume, thereby increasing the likelihood of detecting the presence of food. Once a detection occurs, the sensors, i.e., the anemone's arms, then become exquisitely focused on the target, and all or most of the arms converge upon the food. Likewise, in one or more embodiments, the cameras may reconfigure, readapt, reposition, reorient, or rearrange. This may be achieved by mounting each camera, or each sub-array, onto a dynamic, computer-controlled mount, such as a common "Pan/Tilt" camera mount, or a telescope gimbal system. These are intelligently controlled to either focus intently, in the common field array mode, on a specific location of interest, or to be spread out in many directions, mosaically sensing a greater FOV, at lesser sensitivity, than when it is intently focusing its attention in the common field array mode.

The imaging system 100 may thus be adaptive, dynamic, or responsive in the sense that it may initially harness the benefit of a stitched field camera array 601 (e.g., a wide composite field of view that, while being suboptimal for capturing images of useful image quality, may be useful for at least initially detecting the possible presence of a target object) and then automatically adapt or reconfigure the camera array into a common field camera array 201 in accordance with the one or more embodiments described herein so as to provide a $\sqrt{N}$ times improvement in signal-to-noise ratio over any individual image captured by any of the individual cameras within the array. In one or more embodiments, the imaging system 100 may manually or automatically reconfigure the array back and forth between the first configuration 601 and the second configuration position 201 as needed or at a desired predetermined interval based on the imaging objective. Although the foregoing description provides an example in which the camera array of the imaging system 100 is reconfigurable between a first position 601 and a second position 201, those of ordinary skill in the art should, based on such description, understand and appreciate that the array may be configured, arranged, adapted, positioned, oriented, or disposed in a virtually limitless number of different spatial configurations (e.g., a third configuration, a fourth configuration, a fifth configuration, and the like) and may be reconfigurable, in an automatic, triggered, or otherwise computer-controlled manner, between some or all of the variety of spatial configurations.

Identification of Uncorrelated Target

Camera Calibration

Figure 7:
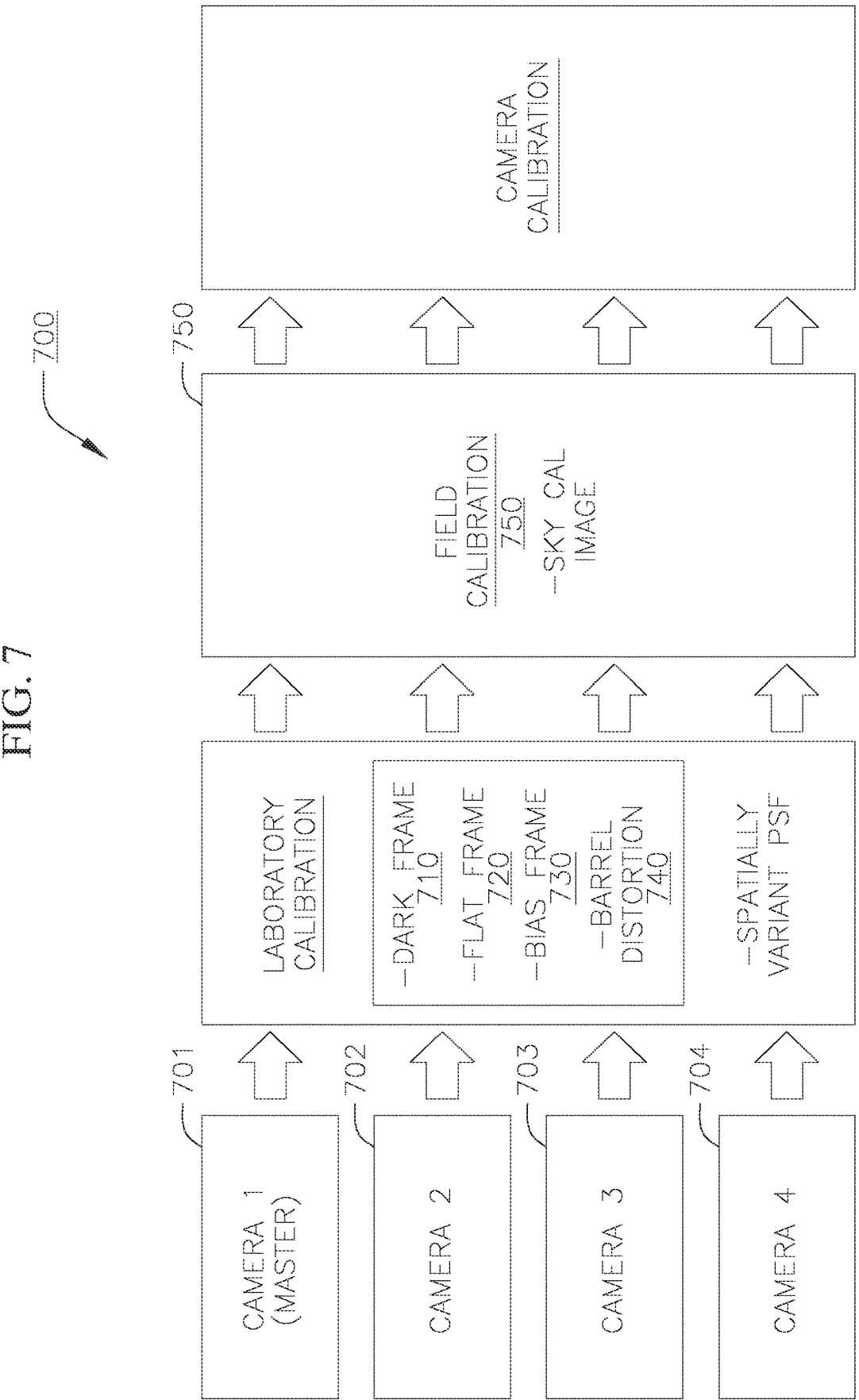
FIG. 7 illustrates, in accordance with one or more embodiments, an exemplary camera calibration process.

Image processing performed by one or more of the embodiments of the imaging system 100 in the context of identifying a faint space object as an uncorrelated target is described. FIG. 7 describes an exemplary camera calibration process 700 which includes any or all of the steps described below. In this example, Cameras 1 through 4 (701 through 704) are being used, where Camera 1 (701) is identified as a Master. In one or more embodiments, all cameras have identical optics, therefore all cameras have identical fields of view (FOY).

Dark Frame Calibration (Laboratory)

In the dark frame calibration step 710, the camera lenses are covered, and the dark frames are collected with each of the cameras 701 through 704 at varying exposures and temperatures. Hot pixels are then detected and logged. The camera/lens responsivity data is used to develop a camera performance model showing image noise versus temperature and exposure length. The responsivity model may be incorporated into the overall system software and applied to actual data frames collected.

Flat Frame Calibration (Laboratory)

In the flat frame calibration step 720, the camera lenses are covered with uniform, translucent filters (e.g., opal glass). The cameras 701 through 704 are then illuminated with a uniform light source. The image frames are then collected with varying exposure. A sensor response/responsivity fall-off model is then developed using the collected frames, which may provide a detailed model of image intensity fall-off as a function of distance from the optical axis. Bias Frame Calibration (Laboratory)

In the bias frame calibration step 730, the camera lenses are covered with a cap, and the cameras 701 through 704 are placed in a dark environment. A shortest possible exposure time is preferably used. The random sensor noise of the cameras 701 through 704 due to on-chip amplifiers is then detected, and preferably mapped with a median of about 5-10 bias frames on the average.

Barrel Distortion Calibration (Laboratory)

In the barrel distortion calibration step 740, the grid-marked test screen is imaged with a wide field optics in order to collect an image with a distortion field created by the lens. The distortion model constants that may correct the image field warping into a flat image are then developed. A pixel-by-pixel map of the image frame relative to the perfect image may also be developed.

Field Calibration

In the field calibration step 750, the sky is imaged with the cameras 701 through 704, collecting a star layout image to be used as a mask (Sky Cal Image).

Data Collection

Figure 8:
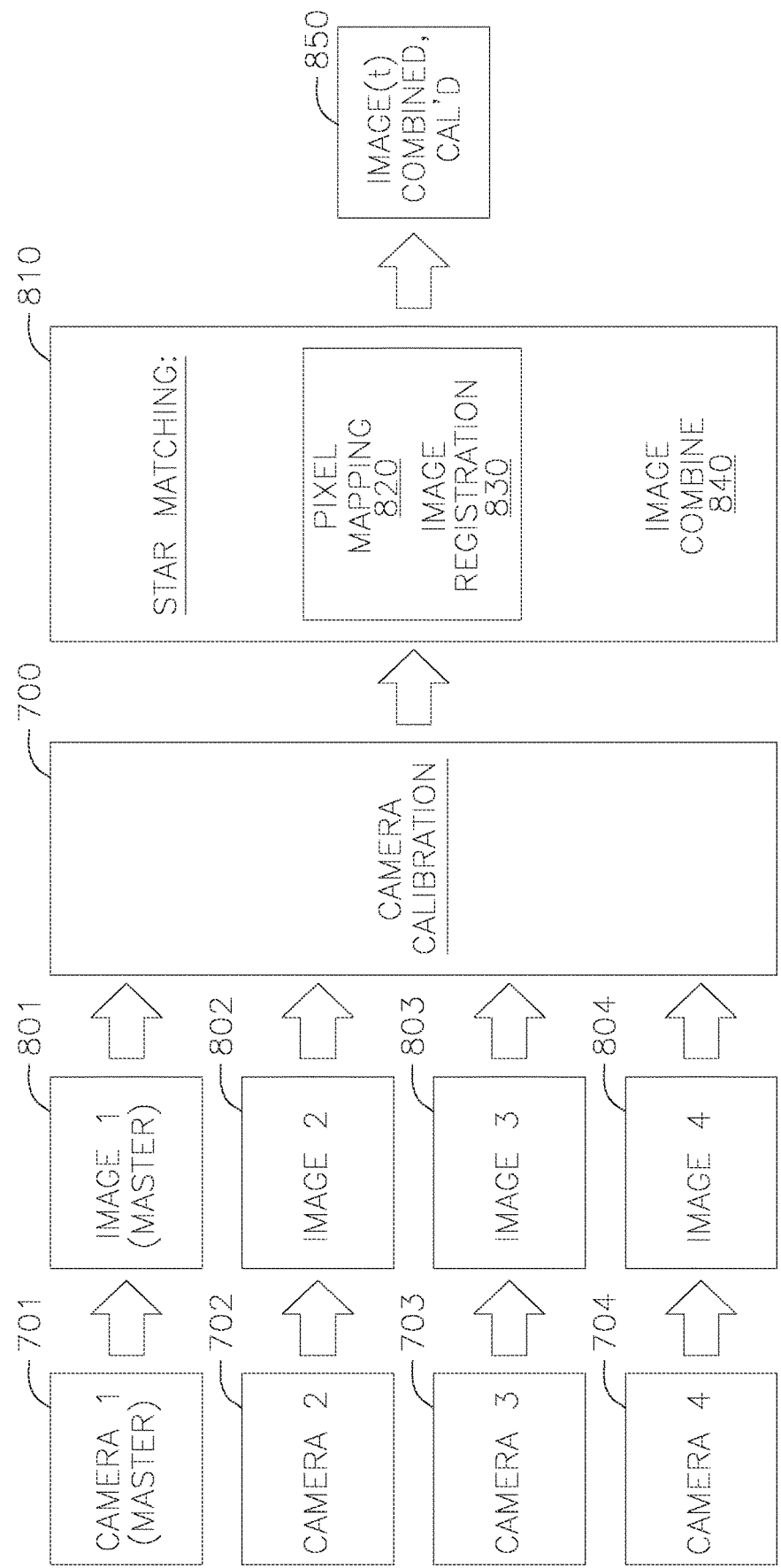
FIG. 8 illustrates, in accordance with one or more embodiments, an exemplary data collection process.

FIG. 8 describes an exemplary data collection process 800 as described below.

Star Matching

A search and detection algorithm is used in the star matching step 810 to identify stars/star constellation patterns in an image 801. This includes pixel mapping 820 and image registration 830. In the pixel mapping 820, an optical axis pointing to the orientation in the right ascension/declination (sky coordinates) is determined using one or more identified star patterns. In one or more embodiments, each sensor pixel of each camera's focal plane sensor is mapped to its own unique right ascension/declination. In the image registration 830, the cameras 1-N (where N=4 in this example) that have been calibrated are registered. The image frames are mapped with one another using the identified right ascension/declination. Each set of a plurality of images 801-804, which are coincident in time and imaging the same or substantially the same area, are registered (aligned) with each other using the stars in the image as reference points.

Image Combine

The individual corresponding pixel values of each registered frame are summed to create the combined image 850 in the image combine step 840. As previously discussed, this addition raises the signal-to-noise ratio of the image by a factor of approximately $N^{1/2}$, or $\sqrt{N}$. Further, this frame addition essentially amplifies the detection capability of the imaging system 100, allowing it to detect dimmer objects collectively, increasing the sensitivity relative to that of a single camera 101. Dimmer objects include smaller objects, or objects at a greater altitude (distance).

Data Reduction

Figure 9:
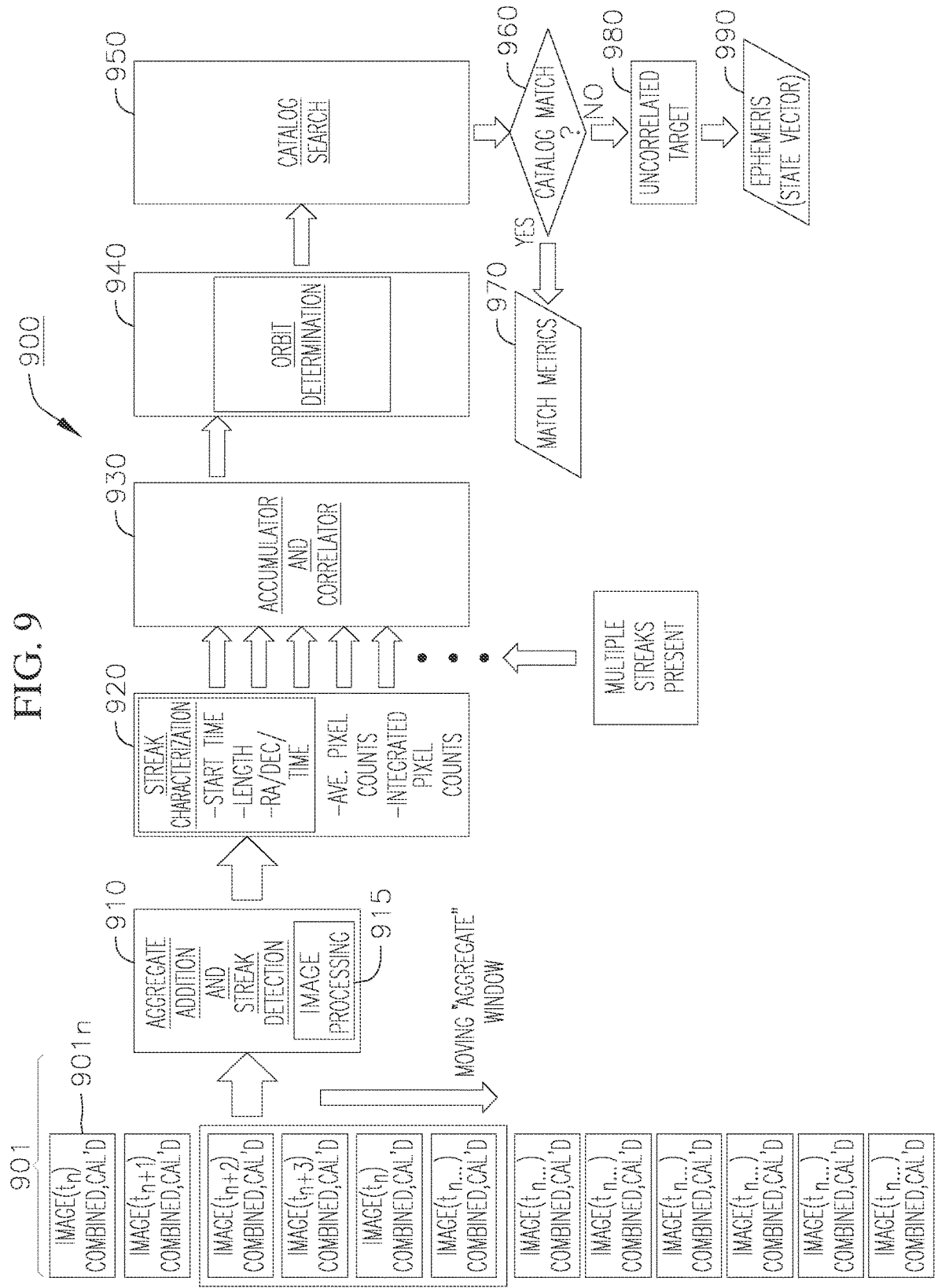
FIG. 9 illustrates, in accordance with one or more embodiments, an exemplary data reduction process.

FIG. 9 describes an exemplary data reduction process 900 as described below.

Aggregate Addition and Streak Detection

In the aggregate addition and streak detection step 910, the first image 901n of a series of captured, combined images 901 is used as a mask to remove stars and other noise sources. Then a number of sequential captured images are registered and aggregated while subtracting the mask image to remove stars. Streaks in image(s) are caused by, e.g., a solar-illuminated space object traveling in orbit during image exposure. The stars appear as essentially points of light, as they are moving very slowly relative to the imaging system 100. The cameras' exposure time is short relative to the stars' motion, while it is long relative to the object's motion. For instance, satellites travel at high angular rates, and on paths typically different from a star's motion. Thus, streaks may be detected by performing an image processing technique 915, such as Hough transform. Hough transform is similar to Radon transform. Radon transform is typically used in processing imagery from an X-ray based computerized axial tomography (CAT) scan, such as one that may be used in medical diagnostic procedures.

Hough transform provides a mathematics-based method to examine imagery and detect streaks, and it may be implemented by software means. Hough transform can provide streak location on the image and its length. This in turn provides streak start and end points. With start and end points and a point in the middle, there now exist three time-tagged points (each having a right ascension and declination coordinate). These time-tagged points may be used to perform Initial Orbit Determination (IOD).

Streak Characterization

In the streak characterization step 920, using the detected streak information, an orbital path relative to mapped image pixels is constructed for the streak using some or all of the following variables:

Start time: to detect when the streak begins in the aggregate image

Length: to detect the total length of the streak and the time of the travel indicated by the streak RA/DEC/Time: to develop the right ascension/declination and time history of a streak Average pixel counts: an average value of pixels in a streak Integrated pixel counts: a summed value of pixels in a streak over the length of the streak Accumulator and Correlator The accumulator and correlator functions 930 operate to accumulate and correlate the streak data in successive aggregations. As a result, the full streak extent is constructed, including such information as the start and stop times, start and stop right ascension/declination, and time vs the right ascension/declination of the imaged object.

Orbit Determination (IOD)

Using the streak time and right ascension/declination data, the orbit parameters are mathematically calculated in the orbit determination step 940. IOD provides an initial estimate of the orbital elements for the object. These elements (values) uniquely describe the orbit shape, size, orientation in inertial space, and object location in the orbit at the time of the estimate (called the "epoch"). Some of the orbital elements are virtually unchanging due to physics, such as the orbit shape (eccentricity) and the orbit inclination (angle of orbit plane relative to earth's equator). Orbital elements may be used to predict the object's position at a future time. Orbital elements may also be used to generate derived parameters, such as the mean motion (how many orbital revolutions per day), and the true anomaly (where the object is in the orbit). The derived parameters may be used to compare the detected object's orbit to the orbits of objects in the current space catalog.

Catalog Search

In the catalog search step 950, using the previously determined orbital parameters above, a star chart such as the US Strategic Command space object catalog is searched. This is done to determine if the orbit parameters of the objects currently in the catalog match the orbit parameters derived from the detected streak (step 960). This process may be simplified to a manageable size by using the derived elements. For example, with respect to the mean motion, it is possible to compare only the detected object's orbit with the orbits of cataloged objects having a mean motion within +/−5% of the detected object's mean motion. Additional steps may be used to further reduce the search space. The metrics or measurement of goodness of the match is reported, if a positive match is found (step 970). The detected object is correlated, and no further action is necessary. If no match occurs within the user-established match criteria, then the imaged object is identified as an uncorrelated target (i.e., not in catalog) (step 980), and the orbit data (ephemeris/state vector) is further provided for use by a narrow field of view sensors for any follow-up (step 990), which may be performed separately by a large aperture, narrow FOV space network asset to identify the object.

The foregoing description is presented for purposes of illustration. It is not intended to be exhaustive or to limit the subject matter to the precise forms disclosed. Those of ordinary skill in the art will readily recognize and appreciate that modifications and variations are possible in light of, and as contemplated by, the present teachings. The described embodiments were chosen in order to best explain the principles of the subject matter, its practical application, and to enable others skilled in the art to make use of the same in various embodiments and with various modifications as are best suited for the particular application being contemplated.

What is claimed is:

1. An imaging system comprising:
    cameras configured to capture respective images;
    a computing device configured to combine the images to generate a combined image; and
    a timecode processor configured to provide timing data having a resolution or accuracy of about 10 milliseconds or fewer to the computing device to generate the combined image based on capture times of the images.

2. The imaging system of claim 1, wherein the computing device is further configured to co-register the images by identifying a common target present within the images.

3. The imaging system of claim 2, wherein the computing device is further configured to determine a respective set of spatial coordinates of the common target in the images to co-register the images.

4. The imaging system of claim 2, wherein the computing device is further configured to align the images such that the common target occupies a same respective pixel location within the images to co-register the images.

5. The imaging system of claim 4, wherein the computing device is further configured to compute a respective spatial transformation for the images to align the images.

6. The imaging system of claim 1, wherein a signal-to-noise ratio of a portion of the combined image is at least $\sqrt{N}$ times greater than a signal-to-noise ratio of at least one of the images, N being the number of images.

7. The imaging system of claim 1, wherein the computing device is further configured to identify a field of view region that is common among respective fields of view of the cameras to generate the combined image.

8. The imaging system of claim 7, wherein the computing device is configured to identify the field of view region by identifying a portion of the field of view of a first camera of the cameras that corresponds to a same spatial region as a portion of the field of view of a second camera, and identifying a portion of the field of view of a third camera that corresponds to a same spatial region as at least a portion of the same spatial region of the first camera and the second camera.

9. The imaging system of claim 1, wherein the cameras are dispersed in respective geographic areas.

10. The imaging system of claim 1, wherein the computing device is further configured to:
    detect an object in a preliminary image of one of the cameras; and
    reconfigure the cameras such that the cameras capture the respective images with the object therein.

11. The imaging system of claim 1, further comprising an array of second cameras configured to capture respective second images,
    wherein the computing device is further configured to:
        combine the second images to generate a second combined image; and
        stitch the combined image as a first combined image together with the second combined image to generate a composite image having a wider field of view than either the first combined image or the second combined image.

12. A method of generating a combined image, the method comprising:
    capturing respective images with cameras;
    combining, with a computing device, the images to generate the combined image comprising respective portions of the images; and
    providing timing data having a resolution of about 10 milliseconds or fewer from a timecode processor to the computing device to generate the combined image based on capture times of the images.

13. The method of claim 12, further comprising:
    capturing a preliminary image by one of the cameras;
    detecting, by the computing device, an object in the preliminary image; and
    reconfiguring the cameras such that the cameras capture the respective images with the object therein.

14. The method of claim 12, further comprising:
capturing respective second images by an array of second cameras;
combining, by the computing device, the second images to generate a second combined image; and
stitching, by the computing device, the combined image as a first combined image together with the second combined image to generate a composite image having a wider field of view than either the first combined image or the second combined image.

15. The method of claim 12, further comprising co-registering, by the computing device, the images by identifying a common target present within the images.

16. The method of claim 12, further comprising identifying, by the computing device, a field of view region that is common among respective fields of view of the cameras to generate the combined image.

17. A non-transitory computer readable medium implemented on an imaging system, the non-transitory computer readable medium having computer code that, when executed on a processor, implements a method of generating a combined image, the method comprising:
capturing respective images with cameras;
combining, with the processor, the images to generate the combined image comprising respective portions of the images; and
providing timing data having a resolution of about 10 milliseconds or fewer from a timecode processor to the processor to generate the combined image based on capture times of the images.

18. The non-transitory computer readable medium of claim 17, wherein the computer code, when executed by the processor, further implements the method of generating the combined image by:
capturing a preliminary image by one of the cameras;
detecting, by the processor, an object in the preliminary image; and
reconfiguring the cameras such that the cameras capture the respective images with the object therein.

19. The non-transitory computer readable medium of claim 17, wherein the computer code, when executed by the processor, further implements the method of generating the combined image by:
capturing respective second images by an array of second cameras;
combining, by the processor, the second images to generate a second combined image; and
stitching, by the processor, the combined image as a first combined image together with the second combined image to generate a composite image having a wider field of view than either the first combined image or the second combined image.

20. The non-transitory computer readable medium of claim 17, wherein the computer code, when executed by the processor, further implements the method of generating the combined image by co-registering, by the processor, the images by identifying a common target present within the images.

* * * * *